United States Patent
Cloyd et al.

(10) Patent No.: US 6,186,693 B1
(45) Date of Patent: Feb. 13, 2001

(54) PASSIVE CAPTURE JOINT WITH THREE DEGREES OF FREEDOM

(75) Inventors: Richard A. Cloyd, Huntsville; Bruce Weddendorf, Decatur, both of AL (US)

(73) Assignee: The United States of America as represented by the Administrator of the National Aeronautics and Space Administration, Washington, DC (US)

( * ) Notice: Under 35 U.S.C. 154(b), the term of this patent shall be extended for 0 days.

(21) Appl. No.: 09/206,146

(22) Filed: Dec. 7, 1998

(51) Int. Cl.$^7$ ........................................... B60D 1/06

(52) U.S. Cl. ..................... 403/122; 403/322.2; 280/511

(58) Field of Search .................... 280/511, 513, 280/901; 403/321, 322.2, 328, 122, 143, 135

(56) References Cited

U.S. PATENT DOCUMENTS

| | | | | |
|---|---|---|---|---|
| 2,089,439 | * | 8/1937 | Silberstein | 403/122 X |
| 2,696,392 | * | 12/1954 | Case | 403/122 X |
| 2,755,105 | * | 7/1956 | Wells | 403/122 X |
| 3,107,109 | * | 10/1963 | Tindale | 403/321 |
| 3,707,303 | * | 12/1972 | Petri | 403/328 |
| 3,827,820 | * | 8/1974 | Hoffman | 403/321 X |
| 4,679,959 | * | 7/1987 | Cavallaro | 403/143 |
| 4,709,454 | * | 12/1987 | Barnes | 403/322.2 X |
| 4,723,877 | * | 2/1988 | Erickson | 403/322.2 X |
| 4,813,810 | * | 3/1989 | Suzuki | 403/322.2 |
| 4,900,181 | * | 2/1990 | Geisthoff | 403/322.2 |
| 5,372,446 | * | 12/1994 | Chamberlin | 403/122 |
| 5,458,431 | * | 10/1995 | Ferreol-Ragotin | 403/322.2 |
| 5,518,335 | * | 5/1996 | Dobbins | 403/328 |
| 5,531,140 | * | 7/1996 | Chow | 403/328 X |
| 5,601,380 | * | 2/1997 | Guthrie et al. | 403/328 X |
| 5,672,024 | * | 9/1997 | Maughan et al. | 403/122 X |
| 6,000,710 | * | 12/1999 | Schocker et al. | 280/511 X |

OTHER PUBLICATIONS

Richard Cloyd and Bruce Weddendorf, Passive Capture Joint with Three Degrees of Freedom, *NASA Tech Briefs*, Jul. 1998, p. 65, vol. 22 #7, Associated Business Publications Company, Ltd.

* cited by examiner

Primary Examiner—Lynne H. Browne
Assistant Examiner—John R. Cottingham
(74) *Attorney, Agent, or Firm*—James J. McGroary

(57) ABSTRACT

A passive capture joint with three degrees of freedom is presented wherein two structural elements are joined together solely by moving the two elements into position, and which when joined together have rotation in all three axes. The inventive apparatus is comprised of two halves: 1) a joint ball mounted on a stem as in a common trailer hitch, and; 2) a socket. The socket consists of a base having an exterior wall and forming an interior chamber, the chamber having a top end and a bottom end, and an interior wall. The chamber is open at the top end, and forms a spherical cup at the bottom end. The socket base's interior chamber is sized to accept the joint ball. The base also forms at least one bore at an acute angle away from the interior chamber's open end. The bores have a first opening in the interior wall of the chamber, and a second opening in the exterior wall of the base. Retaining balls sized to fit within the bores, but to only partially pass through the first opening, are moveably housed within the bores. The retaining balls are moveably held in the first opening by a compression spring housed in the bore. As the joint ball is inserted in the chamber it forces the retaining balls back into the bore until the equator of the joint ball passes. Because the bore is at an acute angle to the chamber the joint ball cannot exit the chamber without the joint being unlocked. The joint is unlocked by rotating a locking ring which encircles the base and covers the second opening. The locking ring has a radial slot for each retaining ball, disposed angularly from the base, and sized to allow passage of the retaining ball in the radial direction when the locking ring is rotated to align the radial slot with the second opening.

3 Claims, 2 Drawing Sheets

PASSIVE CAPTURE JOINT WITH THREE DEGREES OF FREEDOM

ORIGIN OF THE INVENTION

The invention described herein was made by an employee of the United States Government and may be manufactured and used by or for the Government for Government purposes without the payment of any royalties thereon or therefor.

BACKGROUND OF THE INVENTION

1. Field of the Invention

The present invention relates generally to capture joints wherein two structural elements are joined together. More particularly, this invention relates to a passive capture joint wherein two structural elements are joined together solely by moving the two elements into position, and which when joined together have rotation in all three axes.

2. Description of Related Art

Presently, devices in this field consist of passive capture joints with varying degrees of freedom, from fixed joints with one degree of rotation, to the crude three degree of freedom joint used on trailer hitches. No similar passive capture joint with three degrees of rotation currently exists.

There is another similar class of joints which includes ball type joints. This is the snap-fit ball joint used in automotive linkages. This type of joint is characterized by low cost and very low strength in the axial direction. These are generally used to transmit forces in a plane normal to the installation axis. This joint is not considered to be a passive capture joint, as it requires more force to assemble than it can safely transmit in the axial direction.

The present invention overcomes the disadvantages of the prior art and allows three degrees of axial rotation without the additional action, power or control signal necessary in manually or power actuated active joints.

Accordingly, it is an object of the present invention to provide a new and improved passive capture joint with three degrees of freedom.

Other aspects, objects and advantages of this invention will become apparent to those skilled in the art to which this invention pertains from a study of the preferred embodiment as set forth in the specifications, drawings and the appended claims.

SUMMARY OF THE INVENTION

The instant invention presents a passive capture joint consisting of two halves: 1) a joint ball mounted on a stem as in a common trailer hitch, and; 2) a socket. The socket contains all of the moving parts and is an important part of the invention. The socket consists of a base having an exterior wall and forming an interior chamber, the chamber having a top end and a bottom end, and an interior wall. The chamber is open at the top end, and forms a spherical cup at the bottom end. The socket base's interior chamber is sized to accept the joint ball. The base also forms at least one bore at an acute angle away from the interior chamber's open end. The bores have a first opening in the interior wall of the chamber, and a second opening in the exterior wall of the base. Retaining balls sized to fit within the bores, but to only partially pass through the first opening, are moveably housed within the bores. The retaining balls are moveably held in the first opening by a compression spring housed in the bore. As the joint ball is inserted in the chamber it forces the retaining balls back into the bore until the equator of the joint ball passes. Because the bore is at an acute angle to the chamber the joint ball cannot exit the chamber without the joint being unlocked. The joint is unlocked by rotating a locking ring which encircles the base and covers the second opening. The locking ring has a radial slot for each retaining ball, disposed angularly from the base, and sized to allow passage of the retaining ball in the radial direction when the locking ring is rotated to align the radial slot with the second opening.

BRIEF DESCRIPTION OF THE DRAWINGS

In the course of the following detailed description, reference will be made to the attached drawings wherein.

DESCRIPTION OF THE PREFERRED EMBODIMENTS

Figure 1:
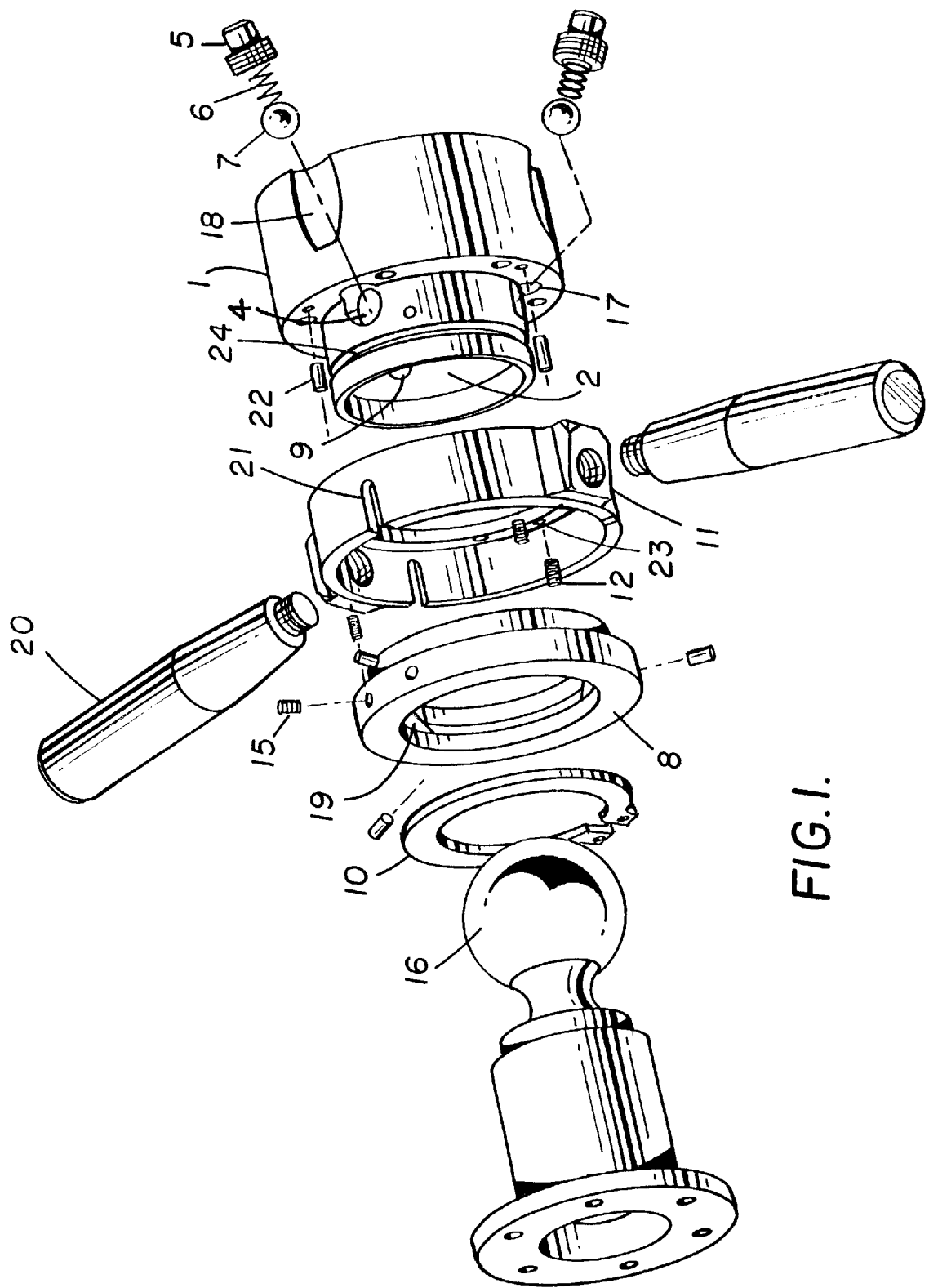
FIG. 1 is an exploded view of a passive capture joint with three degrees of freedom of the present invention.

In the following description, like reference characters designate like and corresponding parts throughout the several views of the drawings.

FIG. 1 illustrates an exploded view of the present invention. It consists of a joint ball (16) mounted on a stem, as is known in the art, and a socket. The socket has a base (1) having an exterior wall, and which forms a chamber (2) having an interior wall, a top end and a bottom end. The chamber (2) has an opening at the top end and a spherical cup (3) at the bottom end. The chamber (2) is sized to accept the joint ball (16).

The base (1) also forms at least one bore (4) at an acute angle away from the open end of the chamber (2), with a first opening (9) in the interior wall of the chamber (2), a second opening (17) in the exterior wall of the base (1), and a third opening (18) in the exterior wall of the base (1). A locking ring (8) rotatably encircles the base (1) and covers the second opening, and is prevented from moving axially relative to the base (1) by a retaining ring (10), which is snapped into a groove (24) formed by the base (1) in its exterior wall. The bore (4) has a threaded portion made to accept a plug (5). The plug (5) is also supported in the bore by a shoulder formed by a step down in the diameter of the bore. The plug (5) has a blind hole which accepts a coil spring (6). Moveably mounted within the bore, between the first opening and the coil spring (6) is a retaining ball (7), sized to pass through the second opening, and to only partially pass through the first opening and partially into the chamber (2).

The locking ring (8) rotates relative to the base, from a locked to an unlocked position. The locking ring (8) has a radial slot (19) for each retaining ball (7) displaced angularly from the base (1). The radial slot (19) is sized to allow passage of the retaining ball (7) in a radial direction, when the locking ring (8) is rotated to align the radial slot with the second opening (18). The radial travel of the retaining ball (7) allows it to fully retract from the chamber (2), thus allowing passage of the joint ball (16) out of the chamber (2).

Rotation of the locking ring (8) is controlled by a locking collar (11), which encircles the locking ring (8) and is slidably retained by it. The locking collar may have handles (20) to facilitate it being rotated and moved axially. The locking collar (11) is pinned to the locking ring (8) by a plurality of radial pins (15) in the locking ring (8), which are sized and positioned to run into corresponding axial slots (21) formed by the locking collar (11). The locking collar (11) is urged axially away from the locking ring (8) and against the base (1) by compression springs (12). A plurality of pins (22) in the base (1) moveably engage a plurality of corresponding holes (23) formed in the locking collar (11). By pulling the handles axially away from the base (1), the pins (22) in the base (1) disengage from the holes (23) in the locking collar (11), allowing the locking collar (11) to rotate. As the locking collar (11) rotates, it rotates the locking ring (8) to which it is pinned, from the locked to the unlocked position and back again.

A preloaded version of the instant invention would involve a compression spring (xx) placed between the closed end of the base (1) and the joint ball (16). The compression spring (xx) is dimensioned to require a predetermined amount of force on the spring before the joint is locked.

Figure 2:
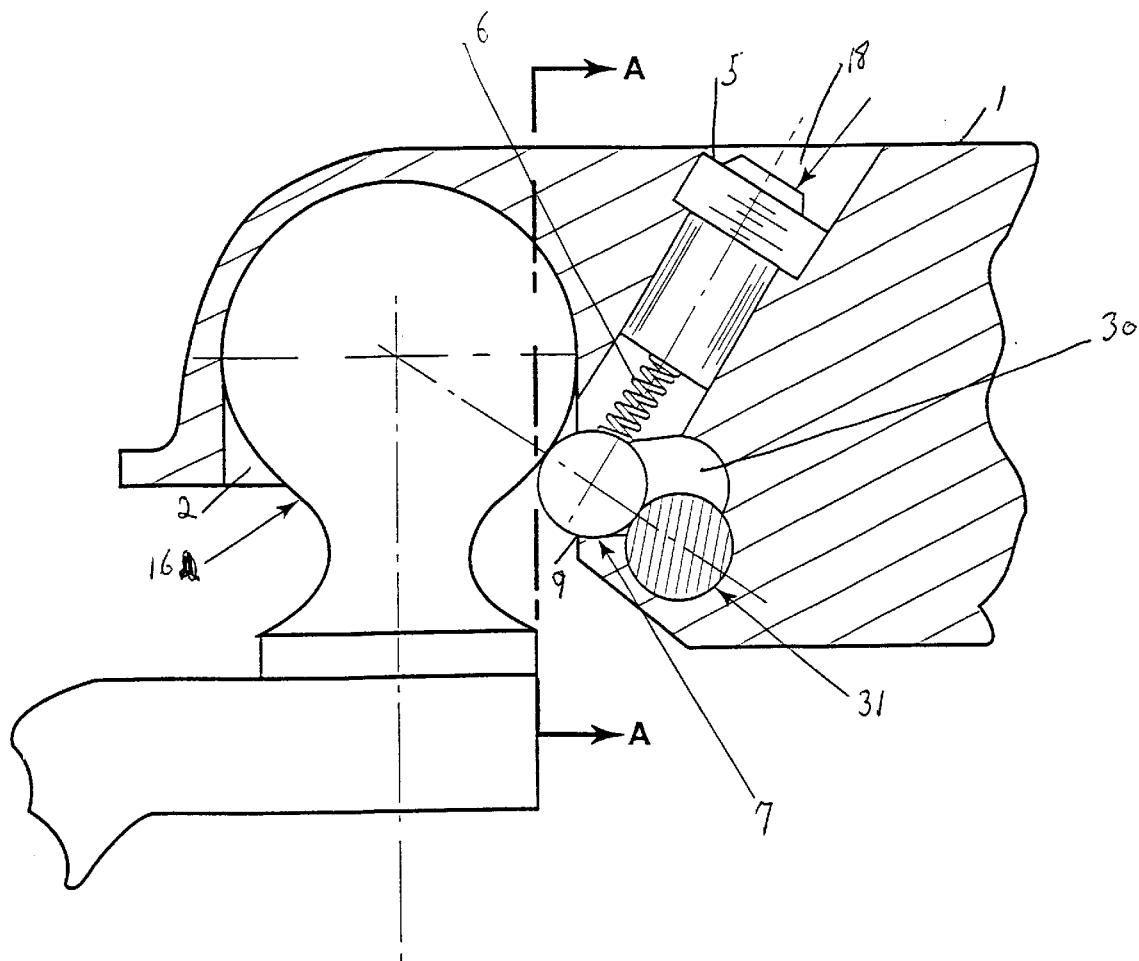
FIG. 2 is a cross section view of an alternate embodiment of the passive capture joint with three degrees of freedom.

An alternate embodiment of the present invention is presented in FIG. 2. This low cost, low strength version uses a locking bar (31) instead of a locking ring. The locking bar (31) is slidably mounted into a slot (30) formed by the base and which transverses tangentially to the chamber (2). The locking bar (31) is sized to align a single retaining ball (7) with the bore (4) and the first opening (9) in the chamber (2). To unlock the joint the locking bar (31) is slid a predetermined distance, allowing the retaining ball (7) to move axially into the slot (30). The locking bar (31) is shaped such that the retaining ball (7) is urged back into the bore (4) and the first opening (9) when the locking bar (31) is slid back into the slot (30).

What is claimed is:

1. A passive capture joint with three degrees of freedom, comprising;
    a base forming an interior chamber, the chamber having an interior wall and an open end and a closed end, the base having an exterior wall, and at least one bore set at an acute angle away from the open end of the chamber, said at least one bore having a first opening in the interior wall of the chamber, and a second opening in the exterior wall of the base;
    a retaining ball housed within said at least one bore, sized to fit moveably within said at least one bore, and to fit partially out of the first opening;
    a means for biasing said retaining ball towards the first opening;
    a locking ring rotatably mounted on and encircling the base and covering the second opening, the locking ring having an interior wall forming a radial slot for said retaining ball, said radial slot displaced angularly from the base, and sized to allow said retaining ball passage in the radial direction when the locking ring is rotated to align the said radial slot with the second opening;
    a locking collar mounted on and encircling the locking ring, the locking collar forming a plurality of axial slots;
    a plurality of pins extending radially from the locking ring, the pins sized and positioned to slidably fit into the axial slots of the locking collar;
    a means for biasing the locking collar axially away from the locking ring;
    a plurality of pins in the base, and;
    a plurality of holes in the locking collar sized and positioned to slidably accept the pins in the base.

2. A passive capture joint with three degrees of freedom as recited in claim 1, further comprising;
    at least one handle mounted on and extending radially from the locking collar.

3. A passive capture joint with three degrees of freedom, comprising;
    a base forming an interior chamber, the chamber having an interior wall and an open end and a closed end, the base having an exterior wall, and a bore set at an acute angle away from the open end of the chamber, the bore having a first opening in the interior wall of the chamber, and a second opening in the exterior wall of the base, the base also forming a slot with an opening radially to the bore, and an opening to the exterior wall of the base;
    a retaining ball housed within the bore, sized to fit moveably within the bore, and within the slot, and to fit partially out of the first opening;
    a means for biasing the retaining ball towards the first opening;
    a locking bar slidably mounted in the slot and sized to align the retaining ball with the first opening in the chamber, and to move within the opening in the slot in the exterior wall of the base, and;
    a means for sliding the locking bar within the slot a predetermined distance and cause the retaining ball to move into or out of the slot.

* * * * *